(12) United States Patent
LoGalbo et al.

(10) Patent No.: US 8,370,417 B2
(45) Date of Patent: Feb. 5, 2013

(54) METHOD FOR PEER TO PEER SUBSCRIBER REGISTRATION AND AFFILIATION

(75) Inventors: Robert D. LoGalbo, Rolling Meadows, IL (US); Bradley M. Hiben, Glen Ellyn, IL (US); Subhash P. Nair, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 477 days.

(21) Appl. No.: 12/165,006

(22) Filed: Jun. 30, 2008

(65) Prior Publication Data

US 2009/0327435 A1 Dec. 31, 2009

(51) Int. Cl.
*G06F 15/16* (2006.01)
(52) U.S. Cl. ........................ 709/201; 370/312
(58) Field of Classification Search .............. 709/201; 370/312
See application file for complete search history.

(56) References Cited

U.S. PATENT DOCUMENTS

| | | | |
|---|---|---|---|
| 7,929,475 B2* | 4/2011 | Simonson et al. | 370/312 |
| 2003/0091011 A1 | 5/2003 | Roberts et al. | |
| 2004/0053602 A1* | 3/2004 | Wurzburg | 455/412.1 |
| 2004/0064693 A1* | 4/2004 | Pabla et al. | 713/168 |
| 2005/0221819 A1* | 10/2005 | Patel et al. | 455/432.1 |
| 2006/0074876 A1* | 4/2006 | Kakivaya et al. | 707/3 |
| 2007/0168336 A1* | 7/2007 | Ransil et al. | 707/3 |
| 2007/0223451 A1 | 9/2007 | Ren | |
| 2007/0280136 A1 | 12/2007 | Chen | |
| 2007/0287452 A1* | 12/2007 | Pan | 455/435.1 |

FOREIGN PATENT DOCUMENTS

WO 2007049204 A1 5/2007

OTHER PUBLICATIONS

International Search Report and Written Opinion for counterpart International Application No. PCT/US2009/048350 mailed on Dec. 16, 2009.
International Preliminary Report on Patentability for counterpart International Application No. PCT/US2009/048350 issued on Jan. 5, 2011.

* cited by examiner

*Primary Examiner* — John Follansbee
*Assistant Examiner* — Glenford Madamba
(74) *Attorney, Agent, or Firm* — Randi L. Karpinia; Anthony P. Curtis; Daniel R. Bestor

(57) ABSTRACT

A method for subscriber registration and affiliation in a peer to peer wide area network is provided. The peer to peer wide area network includes at least one Subscriber and a plurality of Peers. The method includes: communicating a registration and affiliation message including a Subscriber Registration Affiliation Index from a Subscriber to a Peer of the plurality of Peers; routing a registration and affiliation update message including a Peer Registration Affiliation Index equal to the received Subscriber Registration Affiliation Index from the Peer to other Peers of the plurality of Peers; comparing the received Peer Registration Affiliation Index with one or more other received Peer Registration Affiliation Indexes by each of the plurality of Peers; and selecting by each of the plurality of Peers a Peer Registration Affiliation for the Subscriber corresponding to a highest value Peer Registration Affiliation Index.

18 Claims, 18 Drawing Sheets

METHOD FOR PEER TO PEER SUBSCRIBER REGISTRATION AND AFFILIATION

FIELD OF THE DISCLOSURE

The present disclosure relates generally to peer to peer wireless communication and more particularly to subscriber registration and affiliation for subscribers operating in a peer to peer wide area network (P2PWAN).

BACKGROUND

A wide area network (WAN) is a network which covers a large geographical area, and uses communications circuits and systems to connect the network nodes. A wide area network can comprise wired technologies, wireless technologies, or a combination thereof. "Wide area" coverage is defined by a number of fixed base stations which are typically distributed geographically over a large area and are connected over a wired network. Often these stations are distributed in such a way that no one station could cover the same geographic area by itself (however this isn't always the reason for such a wide area network). This enables a first mobile wireless radio within coverage of a first fixed base station to communicate with other (second, third, etc.) mobile wireless radios within coverage of remote fixed (second, third, etc.) base stations. Other types of units which can be on the wide area network (WAN) are console units—these are units where users can communicate to other console users as well as mobile radio users; however the console connects to the network over a wire rather than wirelessly.

Wireless wide area networks utilize communication technologies such as WIMAX (Worldwide Interoperability for Microwave Access), UMTS (Universal Mobile Telecommunications Service), GPRS (General Packet Radio Service), CDMA (Code division multiple access), GSM (Global System for Mobile communications), CDPD (Cellular Digital Packet Data), HSDPA (High-Speed Downlink Packet Access), 3G (third generation), 4G (fourth generation), Motorola's MOTOTRBO™ digital two-way radio system, and the like, to transfer data.

Within a wide area network, a variety of communication scenarios can co-exist. For example, one use of the wide area network is to enable a group call (i.e. one mobile radio user transmitting to many mobile radio users who are listening). Other examples of communication scenarios within a wide area network are a private call (i.e. one mobile radio user to one other mobile radio user), a short data call (e.g. text messaging), and an emergency call.

Peer to Peer communication (P2P) is a topology where "Peers" talk directly without go-betweens. Peer-to-peer is a communications model in which each party has the same capabilities and either party can initiate a communication session.

The Internet is a worldwide, publicly accessible series of interconnected computer networks that transmit data by packet switching using the standard Internet Protocol (IP). It is a "network of networks" that consists of millions of smaller domestic, academic, business, and government networks, which together carry various information and services.

It is desirable in some situations for a Peer to Peer (P2P) Wide Area Network (WAN) to be deployed over the Internet. For example, the P2PWAN can be composed of single frequency conventional stations connected P2P over the Internet. The "Peer" is terminated in the stations. The term Peer and station are synonymous.

In such systems, there is a requirement that the subscriber be registered on only one Peer at a time; it must also be affiliated to one Talkgroup at a time. The registration/affiliation message from a subscriber to a station, over the air (OTA), must contain at least the subscriber's identification (ID) and the talkgroup to which it desires to affiliate.

Typically, there is no control channel in the system directing subscribers to a media channel. In a P2PWAN consisting of many different stations on different outbound frequencies, media intended for that subscriber will be sent to that subscriber on only one frequency. Therefore the P2PWAN and subscriber must align to the same frequency so that the subscriber shall receive the media.

The purpose of the registration/affiliation message is to "pull" media to the one station on which the subscriber is registered/affiliated. The subscriber is "parked" on the frequency of the station on which the registration/affiliation was received, waiting for activity. If there is activity on the P2PWAN, the WAN knows on which Peer the registration/affiliation was received. All media that corresponds to the subscriber's ID in the registration message or the talkgroup in the affiliation message is then sent to that one station upon which the registration/affiliation was received. That one station upon being sent media for that one subscriber from other Peers in the P2PWAN then transmits the media outbound to the subscriber. All of this assumes there is one valid registration/affiliation on only one Peer for that one subscriber. If there is a mismatch between the frequency on which the subscriber is "parked", the subscriber will not receive the media.

If a method of reliability isn't employed in the system, a race condition can occur; the P2PWAN may think the subscriber is parked on one Peer's frequency when actually the subscriber is parked on a different frequency. In this case, media would be routed to the wrong station, the wrong station will then either transmit the media on a frequency the subscriber isn't listening to (and therefore the subscriber doesn't get the media), or dump the media packet (and therefore the subscriber doesn't get the media), or route the audio to the station that Peer thinks is the correct Peer (and therefore the subscriber may or may not get delayed media), or inform the sending Peer, what it thinks is the correct Peer (and the subscriber may still not get the media).

Accordingly, there is a need for a method and apparatus for reliable peer to peer subscriber registration and affiliation in a P2P WAN in which the WAN is deployed over the Internet.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
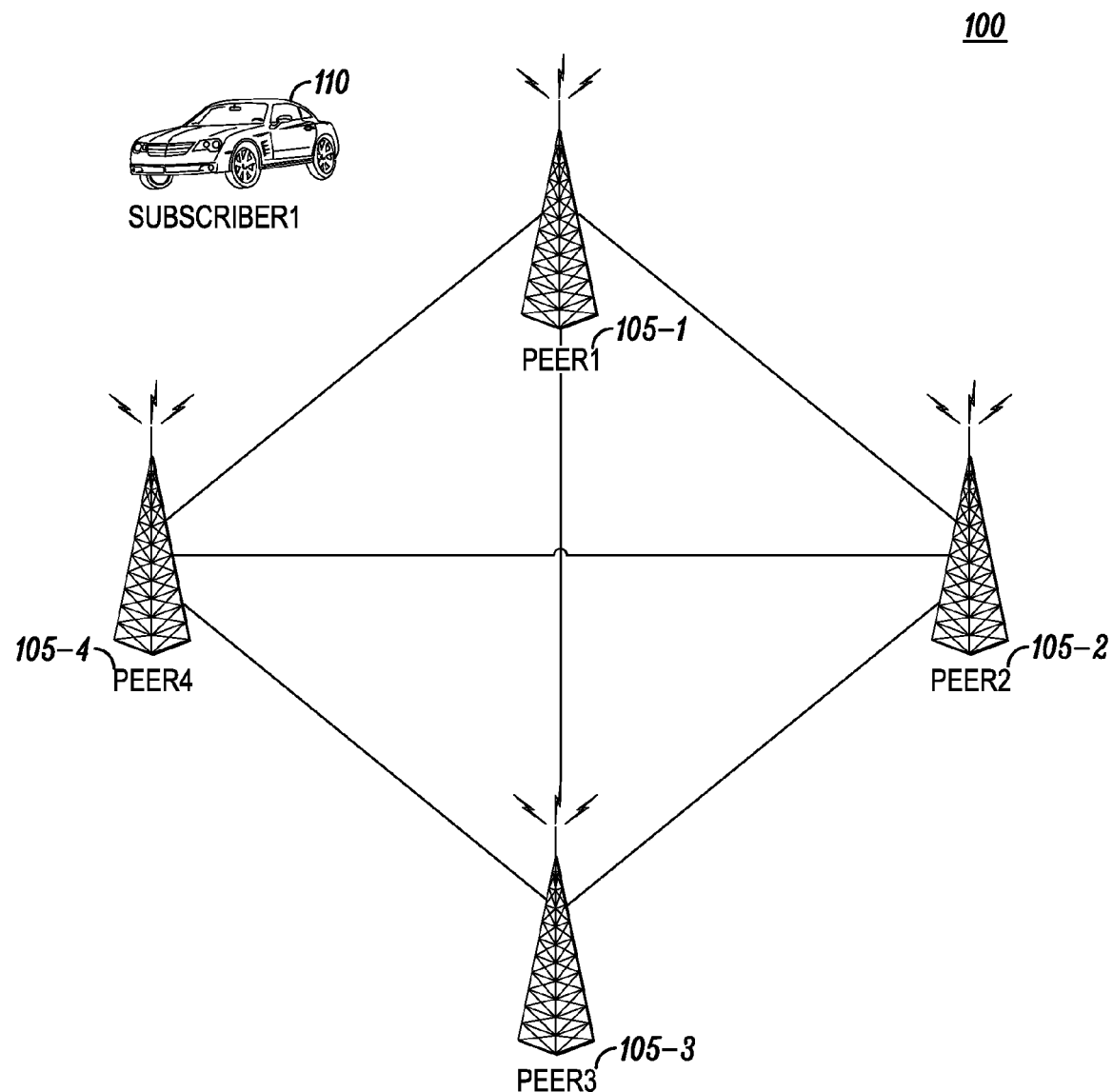
FIGS. 1 through 7 are block diagrams of an example peer to peer wide area network (P2PWAN) and various states of operation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Terms/Definitions

Affiliation—A message (usually tied with the registration message) telling the peer which talkgroup media a subscriber would like to receive.

Inbound—a call OTA from a subscriber to a Peer (i.e. station).

OTA—Over The Air

Outbound—a call OTA from a Peer (i.e. station) to a subscriber.

Personality—Frequency/Talkgroup/Color Code combination which can be changed by the user moving a knob on the subscriber to a new détente position. The Personality can also be changed when the user or subscriber detects the need to update to which station (Peer) to register; this need to update its registration can be triggered by the subscriber detecting a new frequency or station with better link margin (i.e. the subscriber may have been mobile and may have moved to a station with better signal quality). That new station may have a different base station ID or color code, different frequency, etc., all necessitating the need to register to the new station.

P2PWAN—P2P Wide Area Network. A P2PWAN is a set of Peers on a WAN all of which have the ability to communicate call control directly to each other without any intermediate, centralized call control entity. This is unlike today's wide area trunking systems which have centralized call control entities. The call control signaling terminates in call control state machines which are resident only on Peers. The call control can be transparently transported over Ethernet, switches, routers etc. that are common OSI Layer 2 and Layer 3 entities on the Internet; however the call control is ignored by all such Internet entities. The only entities that interpret the call control are Peers. Therefore in the P2PWAN, call control is processed by multiple geographically separated entities rather than one centralized entity.

Peer—termination of Peer identity in a fixed radio base station. Therefore equivalent to a station.

Registration—A message (usually tied to an affiliation message) sent from a subscriber to a base station that tells the base station, that this is the frequency upon which the subscriber is parked waiting for media.

Station—fixed radio base station or Peer. Stations are typically full duplex (but may be half duplex in some situations.) They are typically fixed frequency e.g. fixed to one transmit/receive full duplex frequency pair. Fixed stations typically do not tune automatically to other receive or transmit frequencies from which they are originally configured.

Subscriber—mobile two-way radio (portable included).

Update—a message sent from one Peer to another Peer which has at least the subscriber's unique ID, talkgroup affiliation, peerRegAffIndex and source Peer ID.

FIG. 1 is a block diagram illustrating an example peer to peer wide area network (P2PWAN) 100 for operation of some embodiments of the present invention. As illustrated, the peer to peer wide area network (P2PWAN) 100 includes a plurality of Peers 105. Although four Peers (peer1 105-1, peer 2 105-2, peer3 105-3, and peer4 105-4) are illustrated in FIG. 1 for illustrative purposes only, it will be appreciated by those of ordinary skill in the art that any number of peers can be implemented in accordance with the present invention.

A Peer 105-$n$, in accordance with some embodiments, is a functional unit located within a base station or console unit. For example, the Peer 105-$n$ can be operating within a base station that is a fixed (non-mobile), full-duplex, radio frequency (RF) (wireless) modem (capable of having both a transmit and a receive frequency pair) which receives control and media (data/voice) from one or more mobile radios and presents the control/media to an entity (the Peer) which typically coincides within the base station. The Peer sends the control/media to other Peers on the WAN. In turn, when the base station's Peer receives control/media from other Peers on the WAN, the Peer forwards the control/media to the base station so that the base station may transmit the media wirelessly to the one or more mobile radios.

Alternatively a Peer 105-$n$ can reside in a separate box, adjacent to the base station or console.

The P2PWAN network 100 further includes at least one Subscriber (illustrated in FIG. 1 as "Subscriber1") 110. The Subscriber 110 is a mobile device such as a two-way radio, a messaging device, a mobile radio, and the like. Once registered/affiliated to the P2PWAN 100, the Subscriber 110 can communicate with one or more other mobile and fixed subscribers through the Peers 105 within the P2PWAN 100.

In accordance with some embodiments of the present invention, the Subscriber 110 includes a "personality knob." The personality knob is a selector knob that typically has eight or sixteen (16) positions, although any number of positions is possible. Each position is a different "personality," meaning a combination of frequency and talk group. A user of the Subscriber 100 can choose a particular Peer for registration/affiliation by choosing that Peer's frequency and also being in communication range such that the Peer receives the registration/affiliation message.

Operationally, in FIG. 1 the Subscriber 110 is not yet registered/affiliated to the P2PWAN 100. Further, the Subscriber 110 user is "spinning" the personality knob on the Subscriber 110. "Spinning the knob" means that the user is turning the knob rapidly or randomly so that the Subscriber 110 changes to a frequency and sends an affiliation message, and then does so again very quickly, and perhaps again and again. This results in a number of affiliation messages being transmitted. In other words, such an operation can cause a rapid succession of registration/affiliations to be sent to different Peers (stations) on different frequencies, thereby incurring race conditions. These race conditions can cause the P2PWAN 100 to mistakenly believe the Subscriber 110 is registered to the wrong Peer, on the wrong frequency and affiliated to the wrong talkgroup. Being registered to the wrong Peer, on the wrong frequency and affiliated to the wrong talkgroup will cause packets to be routed to the station which is on a frequency on which the Subscriber 110 isn't listening.

Figure 2:
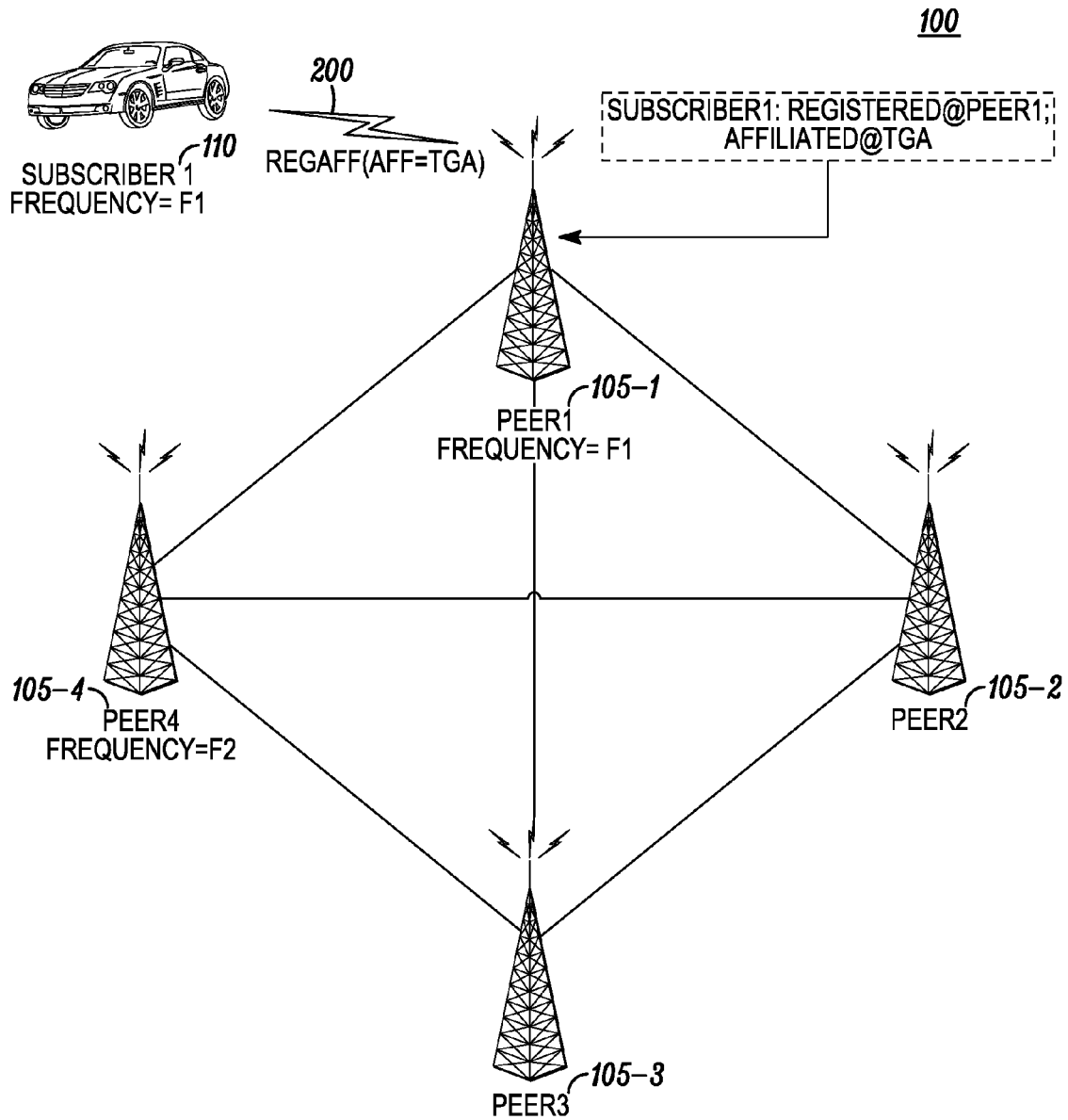

FIG. 2 illustrates the P2PWAN 100 of FIG. 1 when the user first causes the Subscriber 110 to register its unique subscriber identification (ID) to Peer1 105-1, and affiliate on TalkGroup A (TgA) at Peer1 105-1 on frequency=f1 by sending an affiliation message 200 to Peer1 105-1 using frequency f1.

Figure 3:
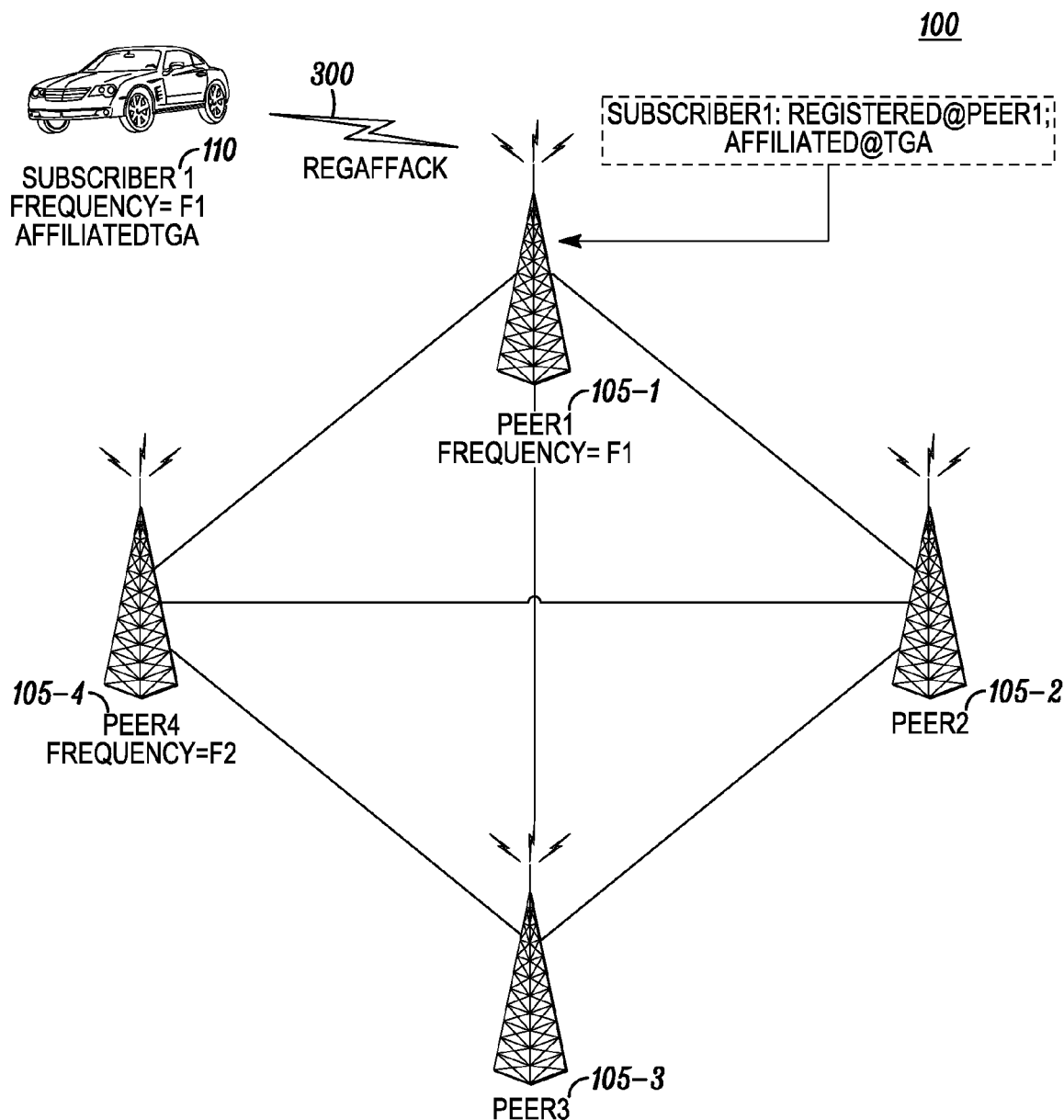

As illustrated in FIG. 3, upon receipt of the affiliation message 200, Peer1 105-1 sends back an acknowledgement 300 to the Subscriber 110. Peer1 105-1 (as does Subscriber 110 currently) considers Subscriber 110 to be registered to Peer1 105-1; affiliated to TgA; and listening on frequency=f1.

Figure 4:
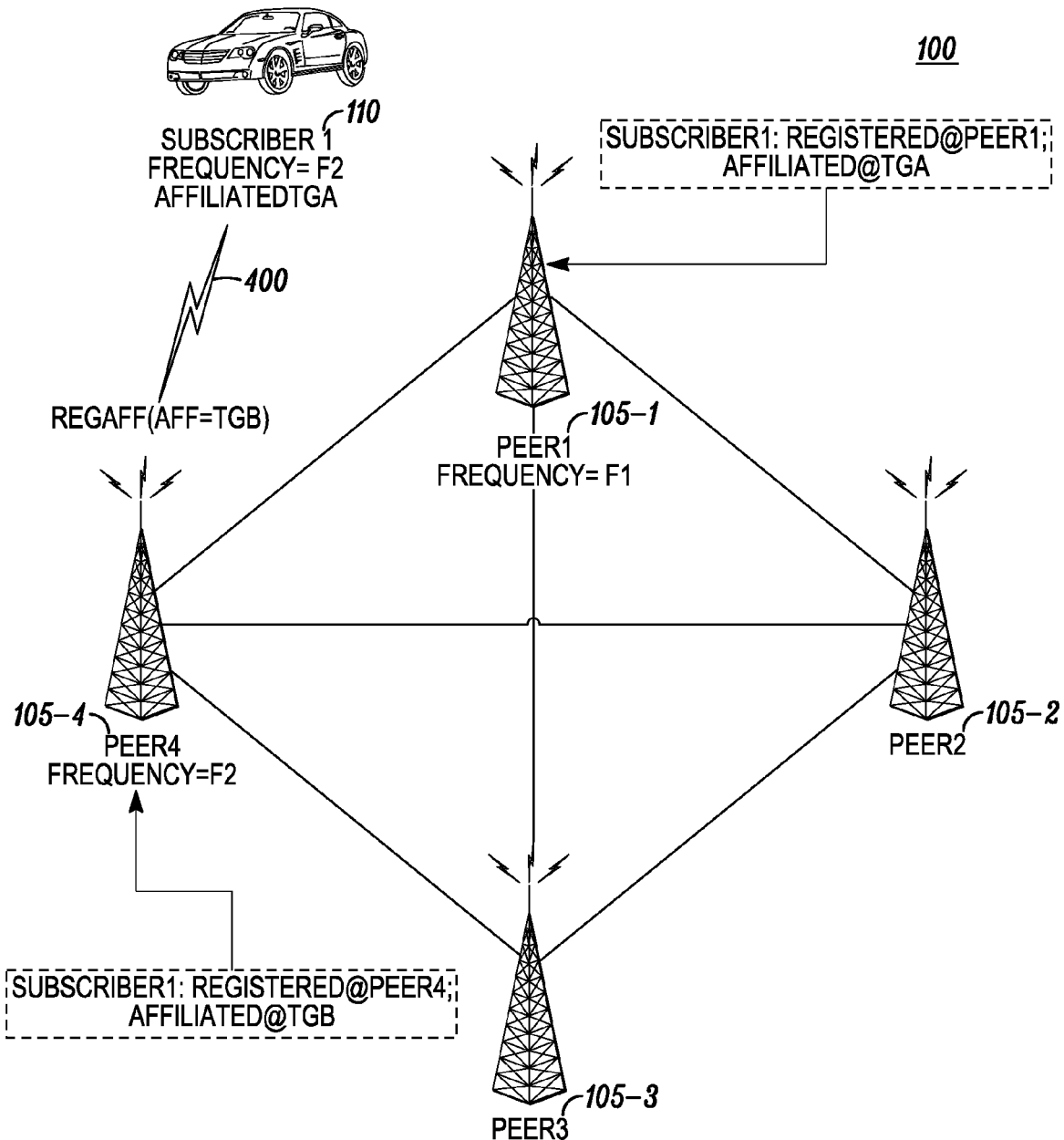

FIG. 4 illustrates the P2PWAN 100 at a later point in time wherein, because the Subscriber 110 user is "spinning" the personality knob on the Subscriber 110, Subscriber 110 now registers its unique subscriber ID to Peer4 105-4 by sending an affiliation message 400 to Peer4 105-4, affiliating on TalkGroup B (TgB) at Peer4 105-4 on frequency=f2.

Figure 5:
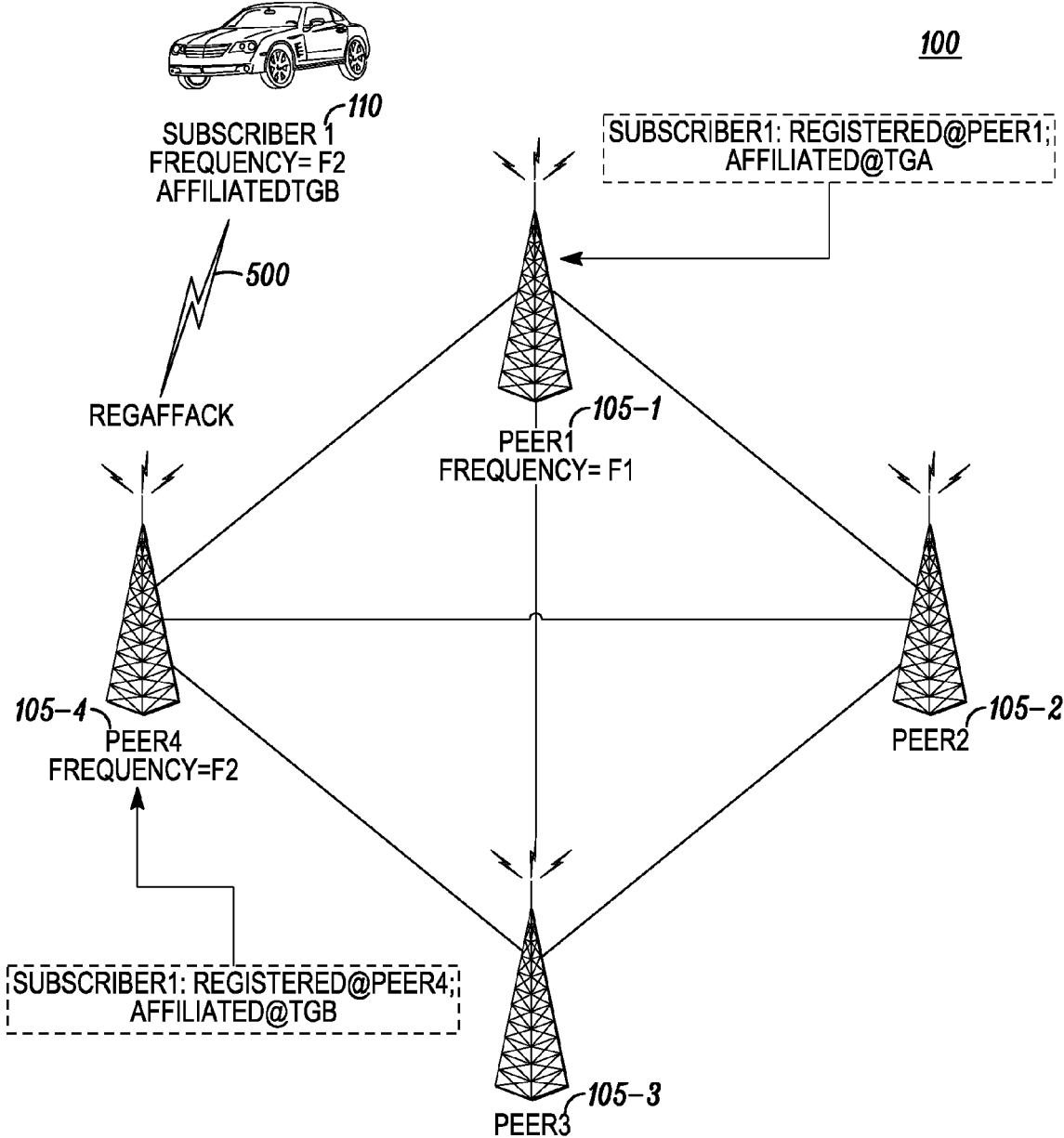

FIG. 5 illustrates the P2PWAN 100 in which the user stays parked on this personality; and further in which Peer4 105-4 sends back an acknowledgement 500 to Subscriber 110. Peer4 105-4 now (as does Subscriber 110 currently) considers Subscriber 110 to be registered to Peer4 110-4; affiliated to TgB, and listening on frequency=f2.

In the architecture as described in relation to FIGS. 1 through 5, each Peer 105 floods the other Peers with registrations/affiliations (i.e. sends a status update to each of the other Peers regarding the registration/affiliation state of Subscriber 110). Regardless of flooding, the same error condition can occur in any design. Flooding increases the probability of a Peer having the wrong assumption to which Peer a subscriber is registered (and to what talkgroup Subscriber 110 is affiliated).

Figure 6:
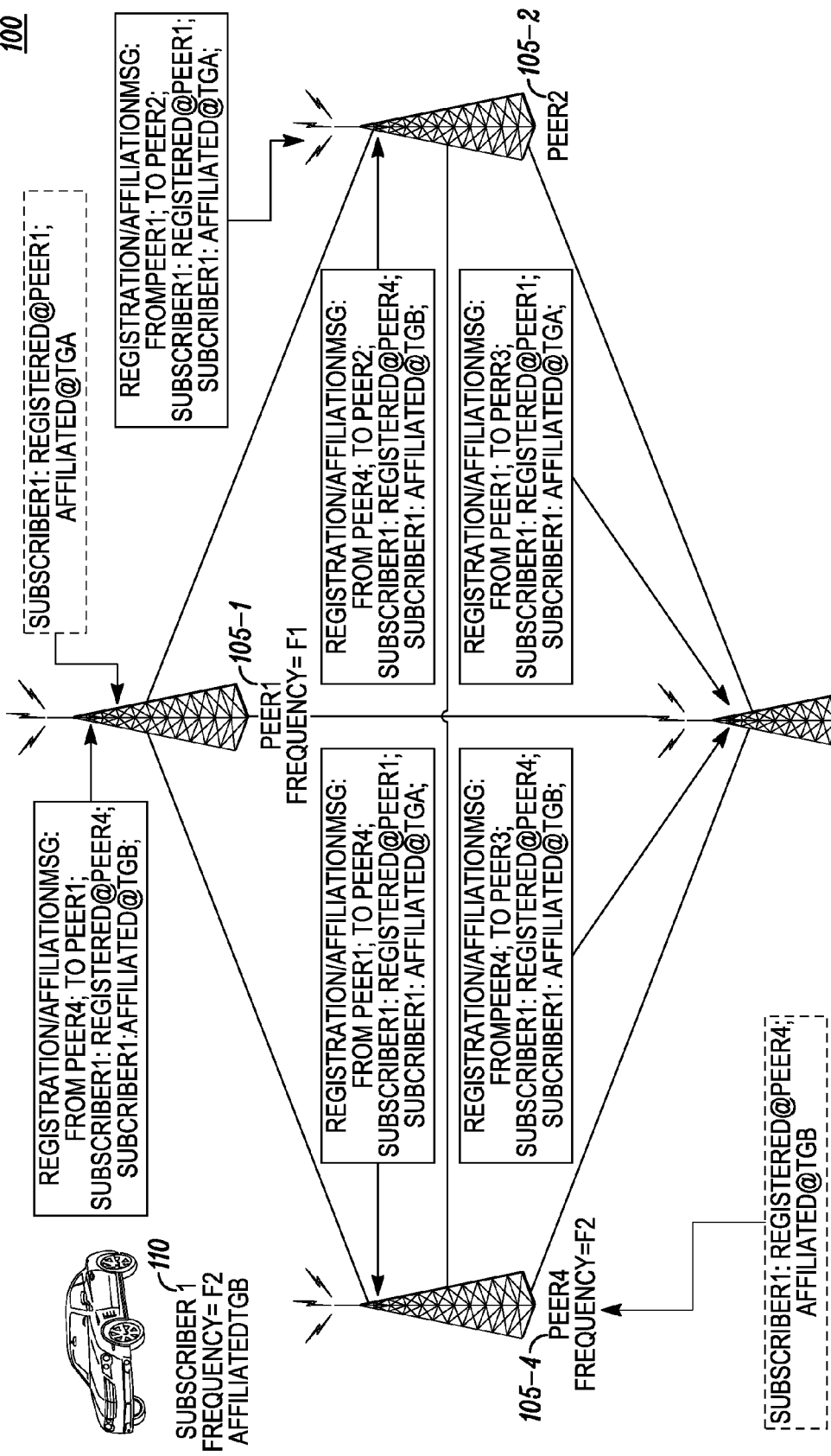

FIG. 6 illustrates the P2PWAN 100 in which Peer1 105-1 and Peer4 105-4 intend to update all other Peers 105 of the P2PWAN 100 that they each have received Subscriber 110's registration/affiliation. As illustrated in FIG. 6, Peer1 105-1 and Peer4 105-4 each update all other Peers 105-n with the registration/affiliation update they each received from Subscriber 110. Peer1 105-1 informs Peer2 105-2, Peer3 105-3, and Peer4 105-4 that Subscriber 110 is affiliated on TgA at Peer1 105-1. Similarly, Peer4 105-4 informs Peer1 105-1, Peer2 105-2, and Peer3 105-3 that Subscriber 110 is affiliated on TgB at Peer4 105-4.

Figure 7:
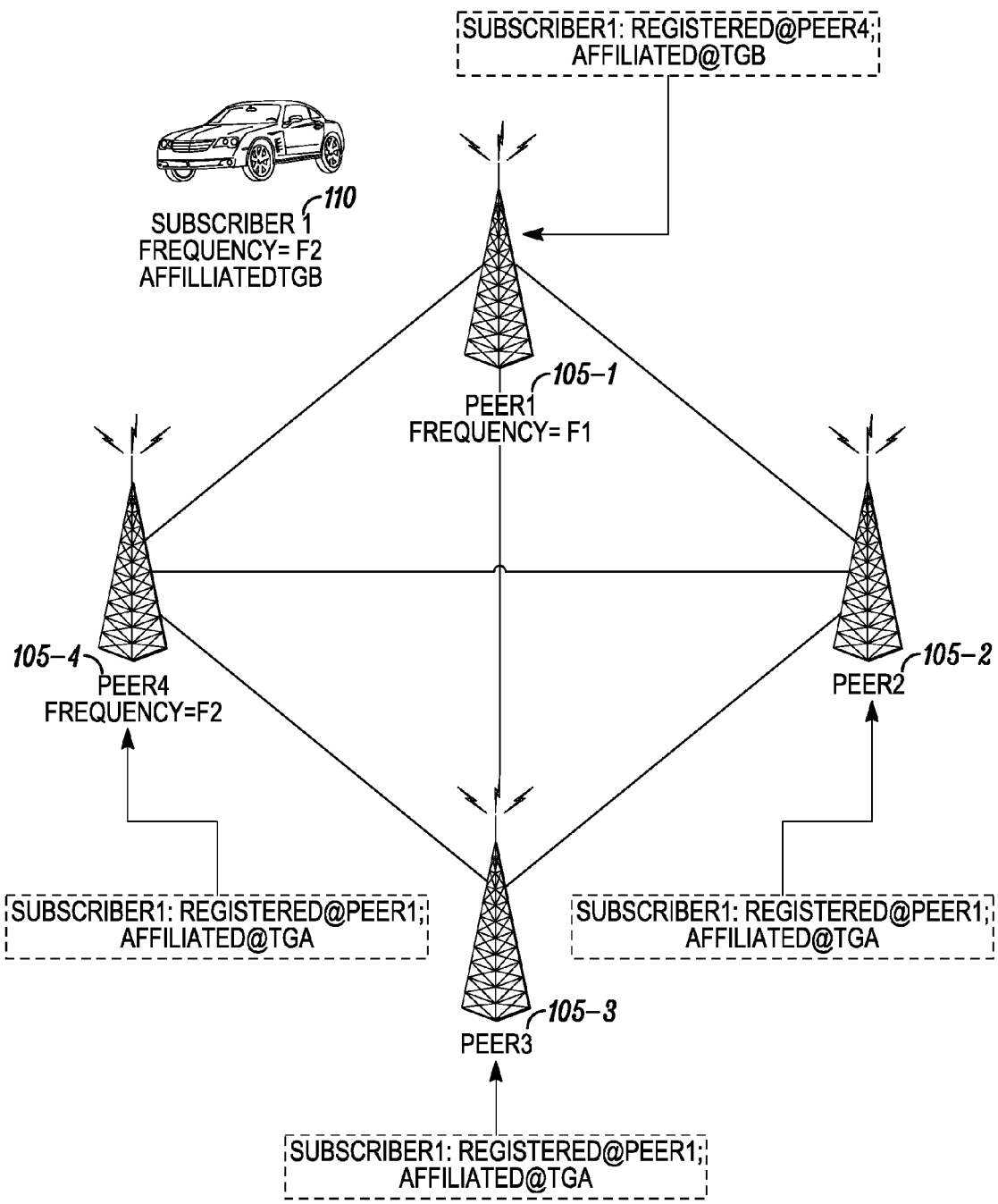

Although in actuality, Subscriber 110 has settled on Peer4's frequency on TgB, due to race conditions, (which can be exacerbated by packet drop), the notifications to the other Peers can arrive misaligned. In other words, even though the registration/affiliation message was sent to Peer4 105-4 after the registration/affiliation message was sent to Peer1 105-1, the update message from Peer4 105-4 may arrive at another peer before the update message from Peer1 105-1. This can happen because of delays and packet loss on the WAN. Without some common reference, the Peers may only assume that the last update received from a Peer is the most valid. FIG. 7 illustrates the potential scenario of registration and affiliations for Subscriber 110 recorded at each Peer. This is also summarized in the state table below:

TABLE 1

Registration/Affiliation State in each Peer for Subscriber 110

| State Location | peerRegistered | TgAffiliation |
| --- | --- | --- |
| Peer1 | Peer4 | TgB |
| Peer2 | Peer1 | TgA |
| Peer3 | Peer1 | TgA |
| Peer4 | Peer1 | TgA |

As illustrated in Table 1 and FIG. 7, Peer2 105-2, Peer3 105-3, and Peer4 105-4 all have incorrectly now recorded that Subscriber 110 is registered to Peer 1 on TgA. Peer2 105-2, Peer3 105-3, and Peer4 105-4 will thereafter route media (group or private) intended for Subscriber 110 to Peer1 105-1. Upon receipt of this media, Peer1 105-1 may not transmit the media OTA since Peer1 105-1 doesn't believe Subscriber 110 is registered to Peer1 105-1 but rather to Peer4 105-4. Alternatively, if Peer1 105-1 routes the media to the correct Peer (i.e. Peer4 105-4), Peer4 105-4 may not transmit the media OTA since Peer4 105-4 believes the subscriber 110 is registered/affiliated to Peer1 105-1. Because neither Peer1 105-1 nor Peer4 105-4 will transmit media to Subscriber 110, it doesn't matter if the architecture is designed so that a Peer corrects the route (e.g. Peer1 105-1 sending packets destined to Subscriber 110 to Peer4 105-4 or Peer4 105-4 sending packets destined to Subscriber 110 to Peer1 105-1) since the terminating Peer will dump the packets.

Therefore, it is desirable to have an unambiguous way of knowing which is the last registration/affiliation received from the subscriber. This will indicate on which frequency the subscriber is parked, the Peer to which the subscriber is registered and the talkgroup to which the subscriber is affiliated.

Figure 8:
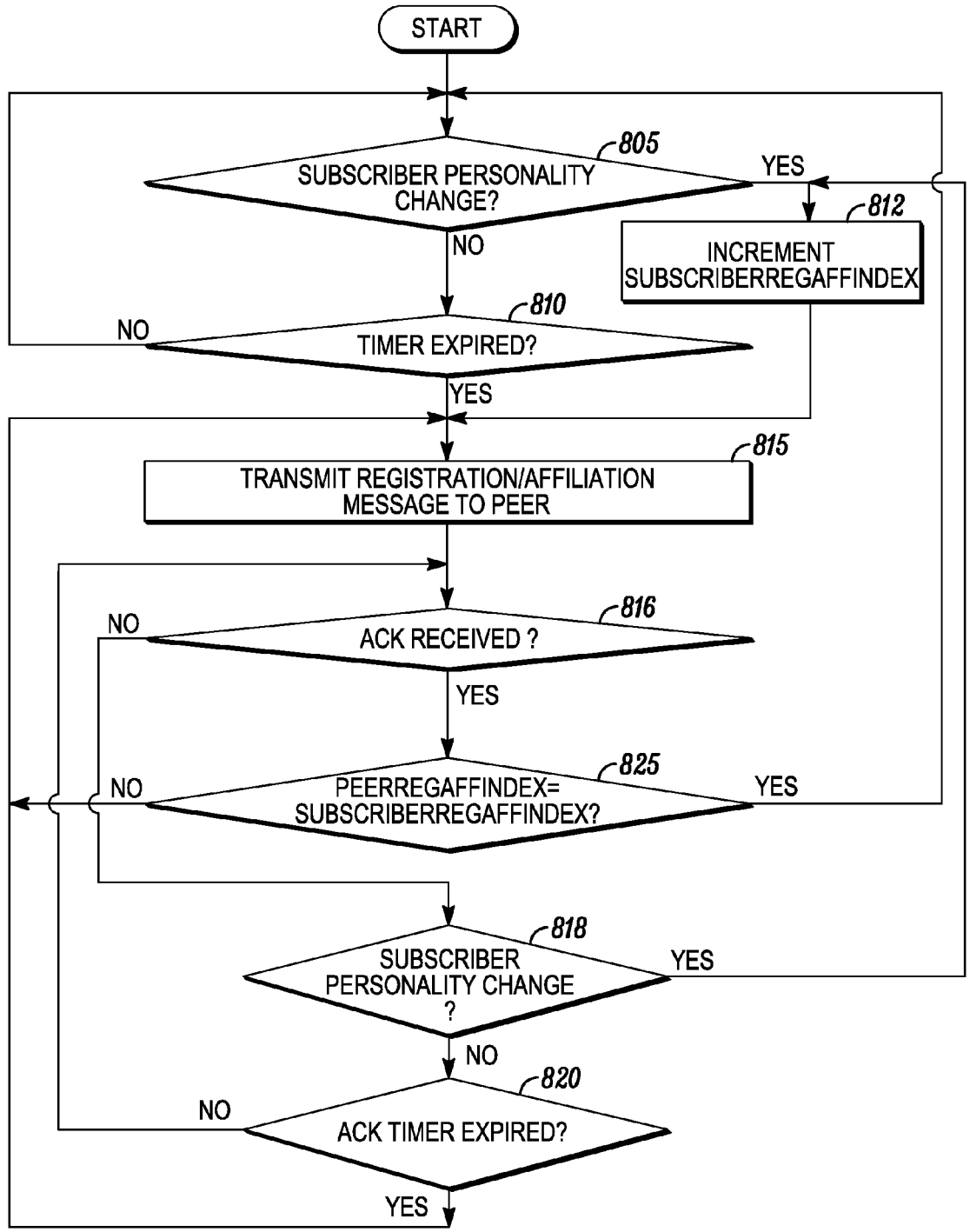
FIG. 8 is a flowchart illustrating a method of operation of a subscriber for peer to peer subscriber registration and affiliation in accordance with some embodiments.

FIG. 8 is a flowchart illustrating a method 800 of operation of a subscriber for peer to peer subscriber registration and affiliation in accordance with some embodiments. As illustrated, the method begins with Step 805 in which a subscriber determines whether or not a personality change has been incurred by the subscriber user. When a personality change has not occurred, the method continues to Step 810 in which the subscriber determines whether or not a timer has expired requiring a renewal of the personality state (i.e. the talkgroup affiliation) with the P2PWAN. When a timer has not expired, the method cycles back to Step 805 and periodically continues checking for a personality change and/or timer expiration. When a timer expiration is detected in Step 810, the method continues to Step 815 in which the subscriber sends a registration/affiliation message over the air to a Peer.

Returning to Step 805, when a personality change is detected in Step 805, the SubscriberRegAffIndex is incremented (that is, increased by a value of one) in Step 812. The operation then continues to Step 815 in which the subscriber sends a registration/affiliation message to a Peer.

Figure 9:
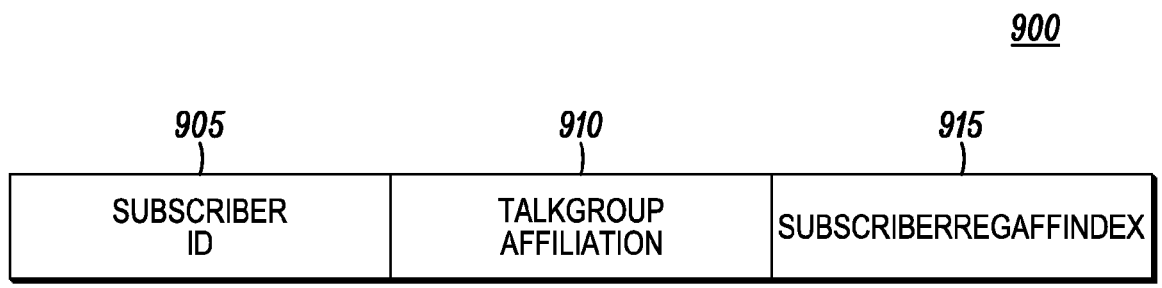
FIG. 9 illustrates a registration/affiliation message in accordance with some embodiments.

FIG. 9 illustrates a registration/affiliation message 900 in accordance with some embodiments. As illustrated in FIG. 9, the registration/affiliation message includes a subscriber ID 905, a talkgroup affiliation 910, and a 24 bit index number (subscriberRegAffIndex) 915. The subscriberRegAffIndex 915 starts at zero (0) when the subscriber is originally programmed.

Returning to FIG. 8, in Step 816, the subscriber periodically checks for receipt of an acknowledgement from the Peer. When an acknowledgement is not received from the Peer, the operation continues to Step 818 in which the Subscriber determines whether or not a personality change has been incurred by the subscriber user. When a personality change has occurred, the method proceeds to Step 812 and onwards, incrementing the subscriberRegAffindex and transmitting a registration/affiliation message in Step 815 thereafter. When a Subscriber personality change has not occurred, the method continues to Step 820 in which the subscriber determines whether or not an ACK (acknowledgement) timer has expired. When the ACK timer has not expired, the method cycles back to Step 816 periodically checking for receipt of the acknowledgement message. When the ACK timer has expired in Step 820, the method cycles back to Step 815, retransmitting the registration/affiliation message to the Peer.

Figure 10:
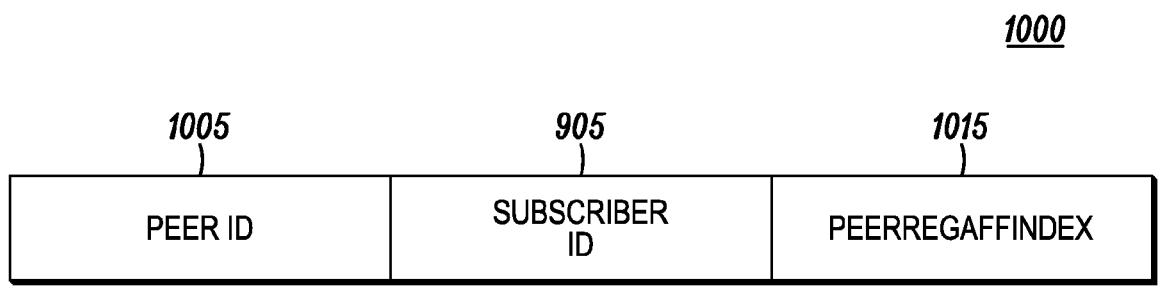
FIG. 10 illustrates an acknowledgement message in accordance with some embodiments.

FIG. 10 illustrates an acknowledgement message 1000 in accordance with some embodiments. As illustrated, the acknowledgement message 1000 includes a Peer ID 1005, the Subscriber ID 905, and a peerRegAffIndex 1015 equal to the subscriberRegAffIndex 915.

Returning to FIG. 8, when, at Step 816, the Subscriber receives the acknowledgement message from the Peer, the operation continues to Step 825 in which the subscriber determines whether or not the received peerRegAffIndex 1015 equals the subscriberRegAffIndex 915. When the received peerRegAffIndex 1015 equals the subscriberRegAffIndex 915, the operation cycles back to Step 805 and the process starts over. When the received peerRegAffIndex 1015 does not match the subscriberRegAffIndex 915, the operation cycles back to Step 815 and the subscriber sends the registration/affiliation message again.

Figure 11:
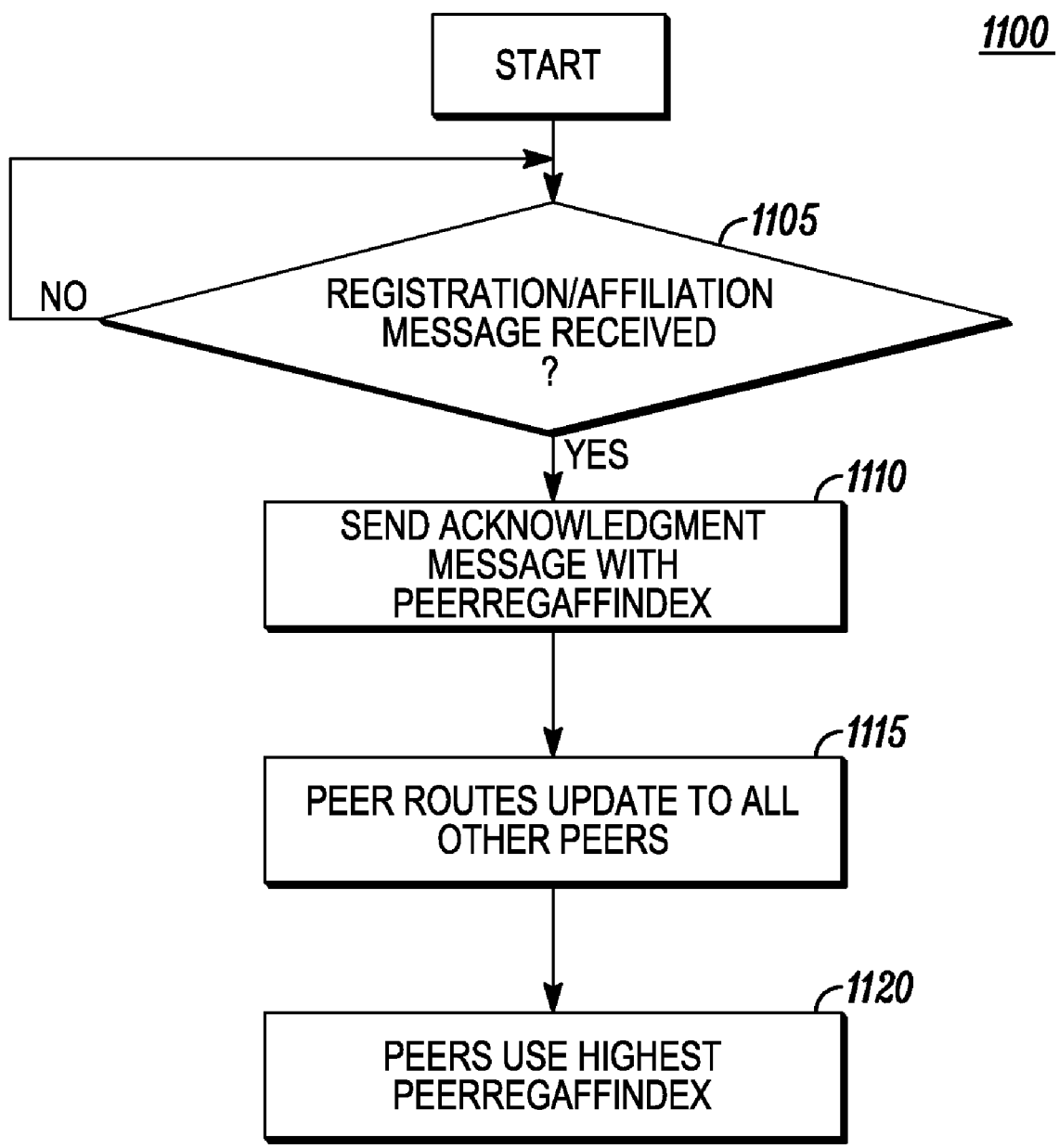
FIG. 11 is a flowchart illustrating a method of operation of a peer for registration and affiliation of a subscriber in accordance with some embodiments.

FIG. 11 is a flowchart illustrating a method of operation of a Peer for registration and affiliation of a subscriber in accordance with some embodiments. As illustrated, the operation begins with Step 1105 in which the Peer waits to receive a registration/affiliation message from the Subscriber. When a registration/affiliation message is received, the operation continues to Step 1110 in which the Peer sends an acknowledgement message that includes a PeerRegAffIndex equal to the SubscriberRegAffIndex the peer just received from the subscriber. Next, in Step 1115, the Peer routes to all Peers the registration/affiliation update including an updated peerRegAffIndex. The registration/affiliation update also minimally includes the Peer ID, Subscriber ID and Talkgroup Affiliation. Next, in Step 1120, the Peers upon receiving a registration/affiliation update compare the peerRegAffIndex with all other received peerRegAffIndexes and assume that the update received with the highest peerRegAffIndex is the valid update to use. Upon receiving a registration/affiliation update, the receiving Peer replies with a registration/affiliation update acknowledgement which includes minimally the peerRegAffIndex in the registration/affiliation update which was received. The valid update "certifies" to which station the subscriber is listening. That "certification" is then used by all other Peers to ensure that if a Peer receives media pertinent to that subscriber, that the media is sent to that station to which the subscriber is listening. Because all other Peers know to which minimal set of station(s) (i.e. Peer[s]) to route the media (audio, video, etc.) media doesn't need to consume bandwidth on a LAN, WAN, RF resource needlessly i.e. Talkgroup (group, PTT) media must be routed minimally to the "certified" station (not necessarily all stations need to transmit the media OTA) so that the subscriber may receive it; private media meant for that subscriber need be routed only to that "certified" station (transmitted only by that one station OTA) so that the subscriber may receive it.

FIGS. 12 through 19 illustrate an example of implementing the operation of FIGS. 8 through 11 in accordance with some embodiments.

Figure 12:
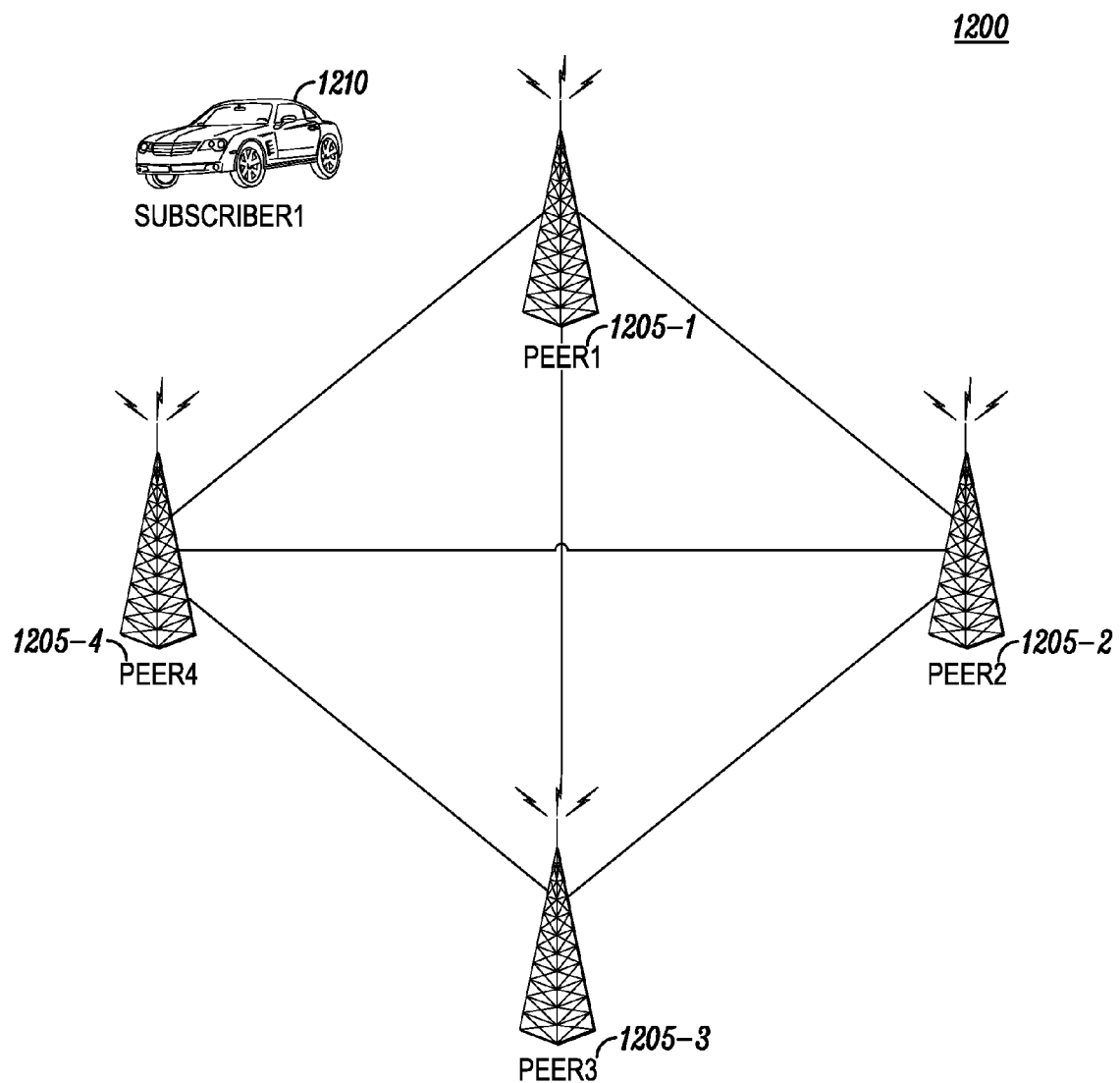
FIGS. 12 through 19 are block diagrams of an example peer to peer wide area network and various states of operation in accordance with some embodiments.

FIG. 12 is a block diagram illustrating an example peer to peer wide area network (P2PWAN) 1200 for operation of some embodiments of the present invention. As illustrated, the peer to peer wide area network (P2PWAN) 1200 includes a plurality of Peers 1205. Although four Peers (peer1 1205-1, peer 2 1205-2, peer3 1205-3, and peer4 1205-4) are illustrated in FIG. 12 for illustrative purposes only, it will be appreciated by those of ordinary skill in the art that any number of peers can be implemented in accordance with the present invention.

The P2PWAN network 1200 further includes at least one Subscriber (illustrated in FIG. 12 as "Subscriber1") 1210.

Operationally, presume in FIG. 12 that the Subscriber 1210 is not yet registered/affiliated to the P2PWAN 1200. Further, for explanation purposes, presume that the Subscriber 1210 user is "spinning" the personality knob (i.e. rapidly changing personalities) on the Subscriber 1210.

Figure 13:
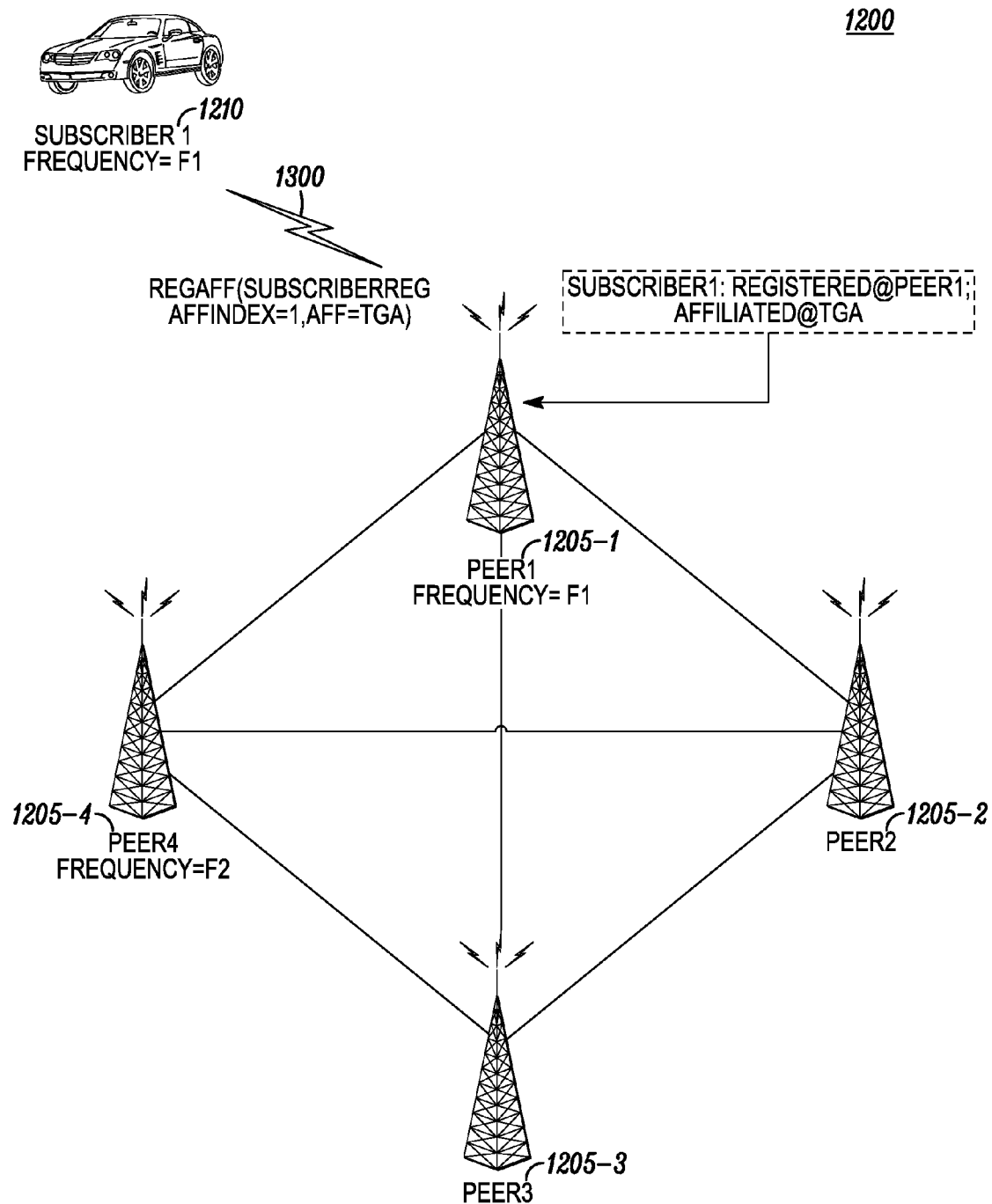

FIG. 13 illustrates the P2PWAN 1200 of FIG. 12 when the user first causes the Subscriber 1210 to register its unique subscriber identification (ID) to Peer1 1205-1, and affiliate on TalkGroup A (TgA) at Peer1 1205-1 on frequency=f1 by sending an affiliation message 1300 to Peer1 1205-1. As illustrated, the user sends the affiliation message 1300 including the subscriberRegAffIndex=1.

Figure 14:
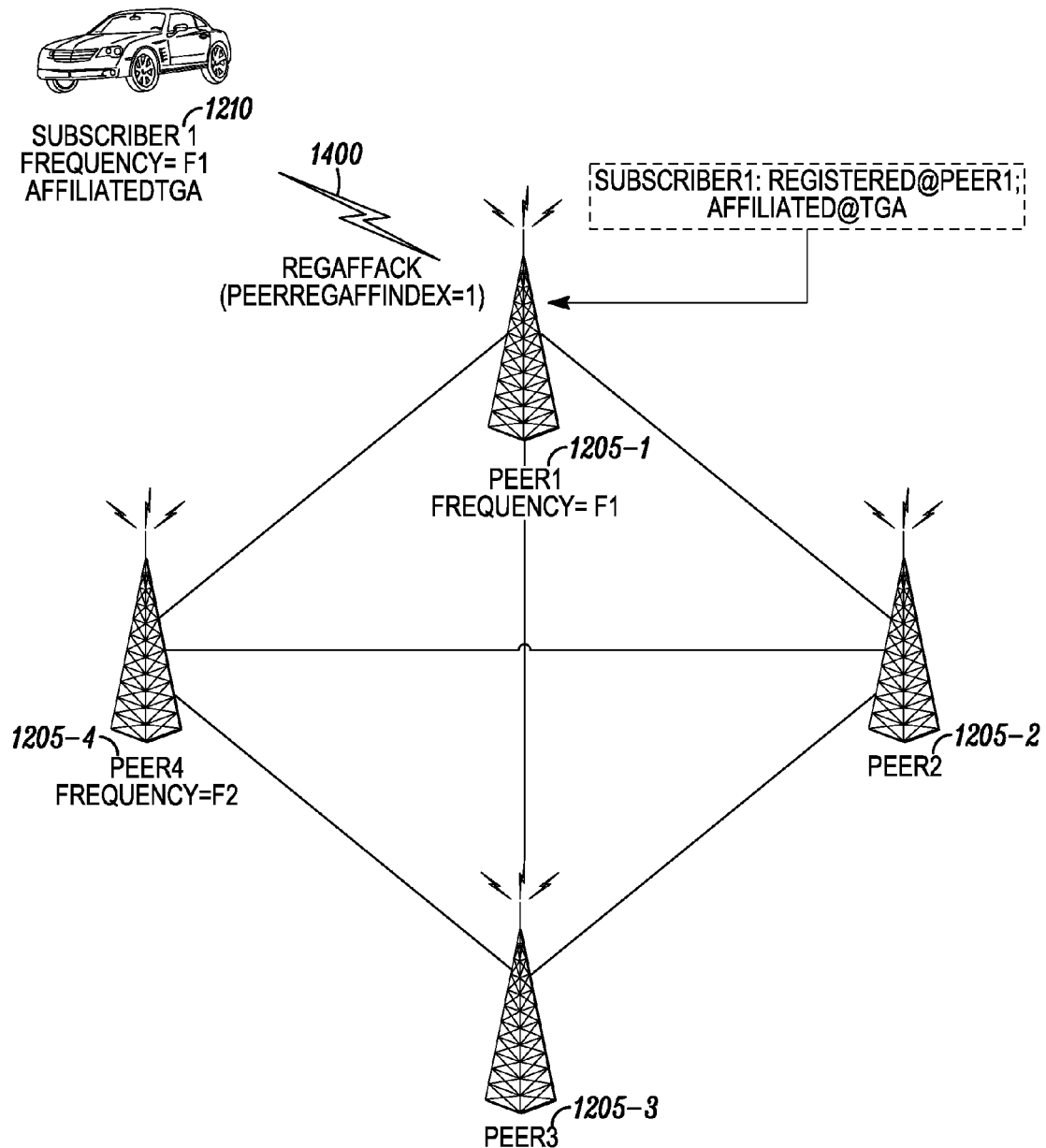

As illustrated in FIG. 14, upon receipt of the affiliation message 1300, Peer1 1205-1 sends back an acknowledgement 1400 to the Subscriber 1210. Peer1 1205-1 (as does Subscriber 1210 currently) considers Subscriber 1210 to be registered to Peer1 1205-1; affiliated to TgA; and listening on frequency=f1. As illustrated, Peer1 1205-1 sends back an acknowledgement message 1400 to including peerRegAffIndex=1.

Figure 15:
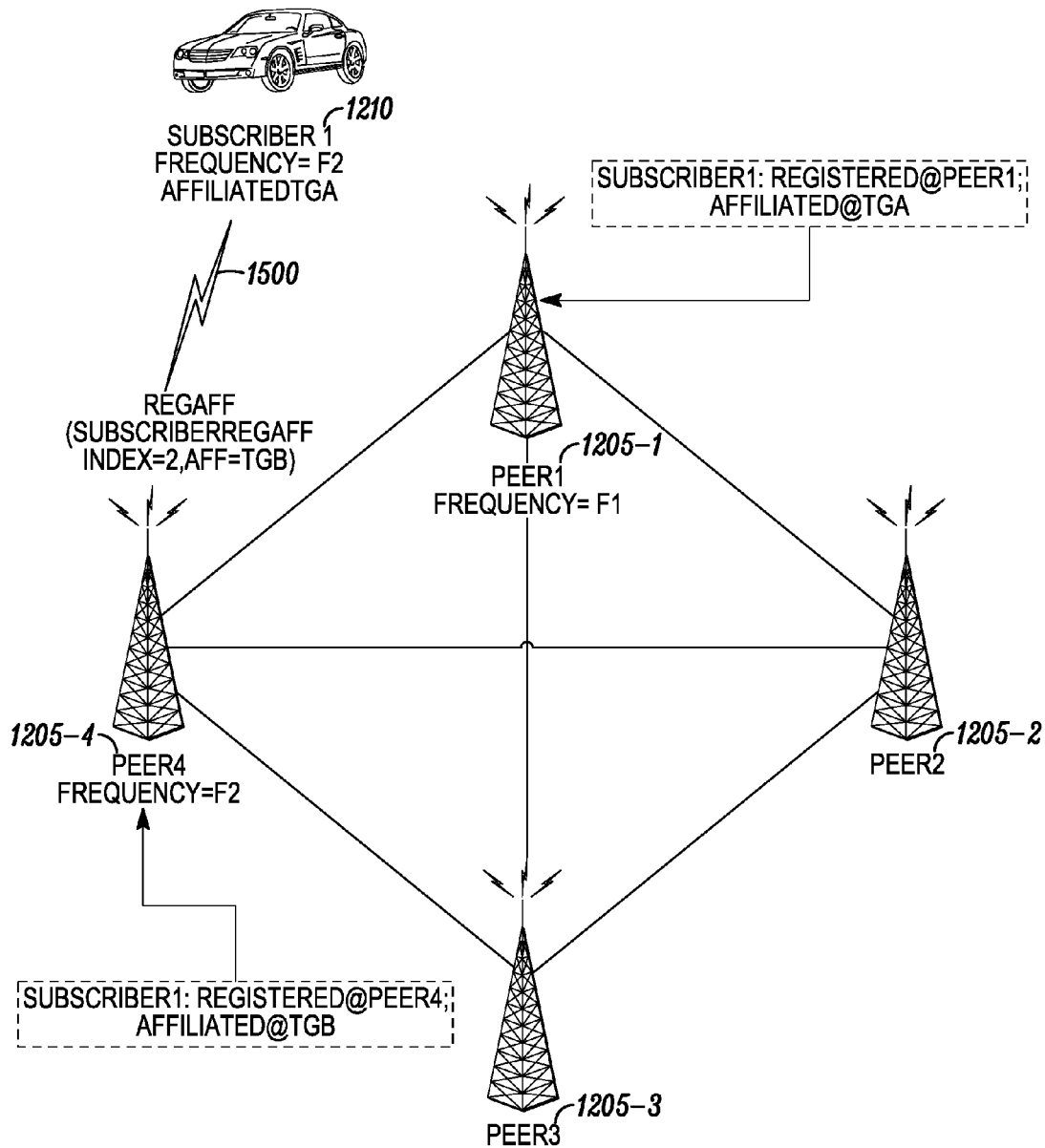

FIG. 15 illustrates the P2PWAN 1200 at a later point in time wherein, because the Subscriber 1210 user is "spinning" the personality knob on the Subscriber 1210, Subscriber 1210 now registers its unique subscriber ID to Peer4 1205-4 by sending an affiliation message 1500 to Peer4 1205-4, affiliating on TalkGroup B (TgB) at Peer4 105-4 on frequency=f2. As illustrated the affiliation message 1500 includes a subscriberRegAffIndex=2.

Figure 16:
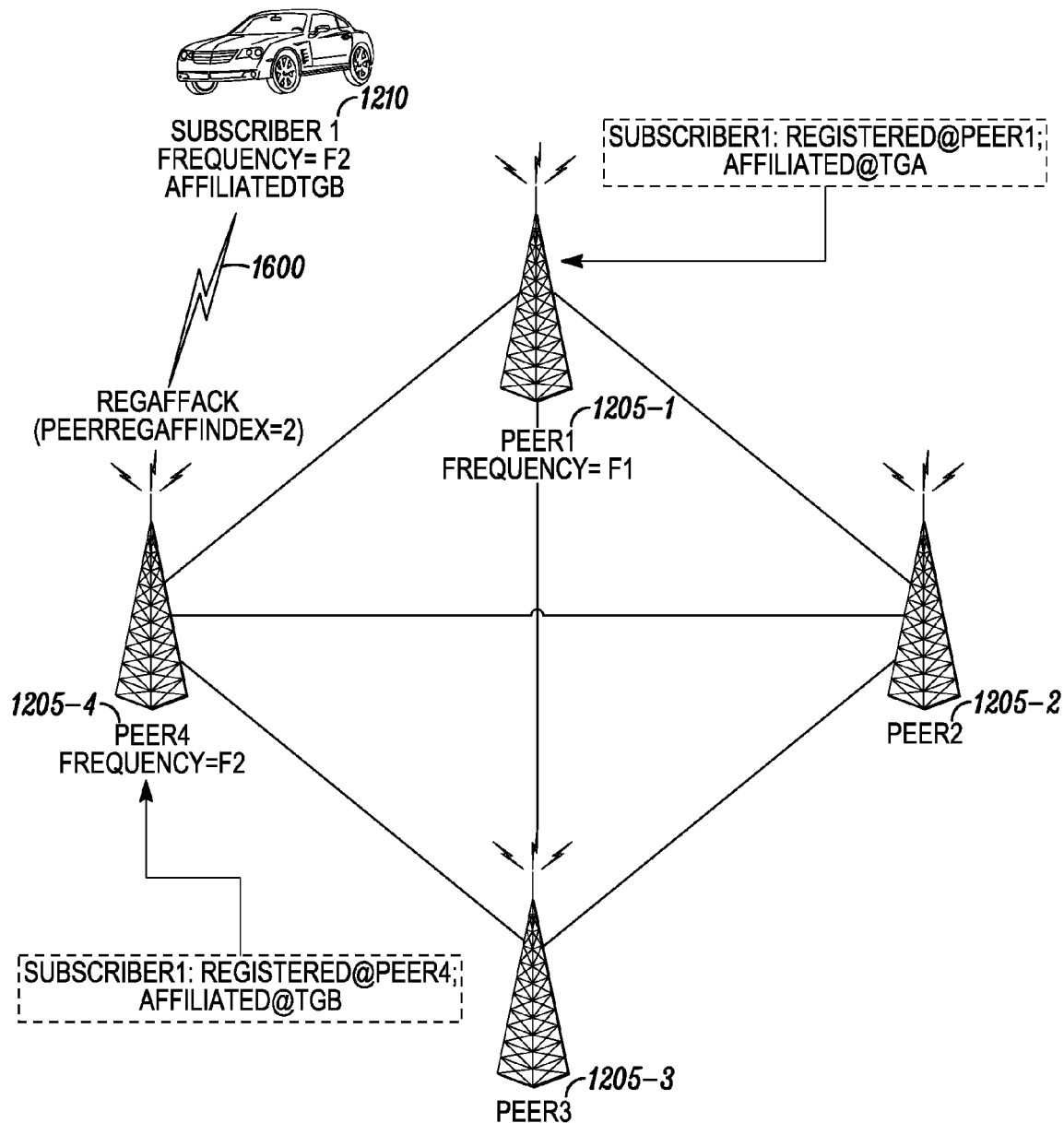

FIG. 16 illustrates the P2PWAN 1200 in which the user stays parked on this personality; and further in which Peer4 1205-4 sends back an acknowledgement 1600 to Subscriber 1210. Peer4 1205-4 now (as does Subscriber 1210 currently) considers Subscriber 1210 to be registered to Peer4 1210-4; affiliated to TgB, and listening on frequency=f2. The acknowledgement message 1600, as illustrated, includes a peerRegAffIndex=2.

Figure 17:
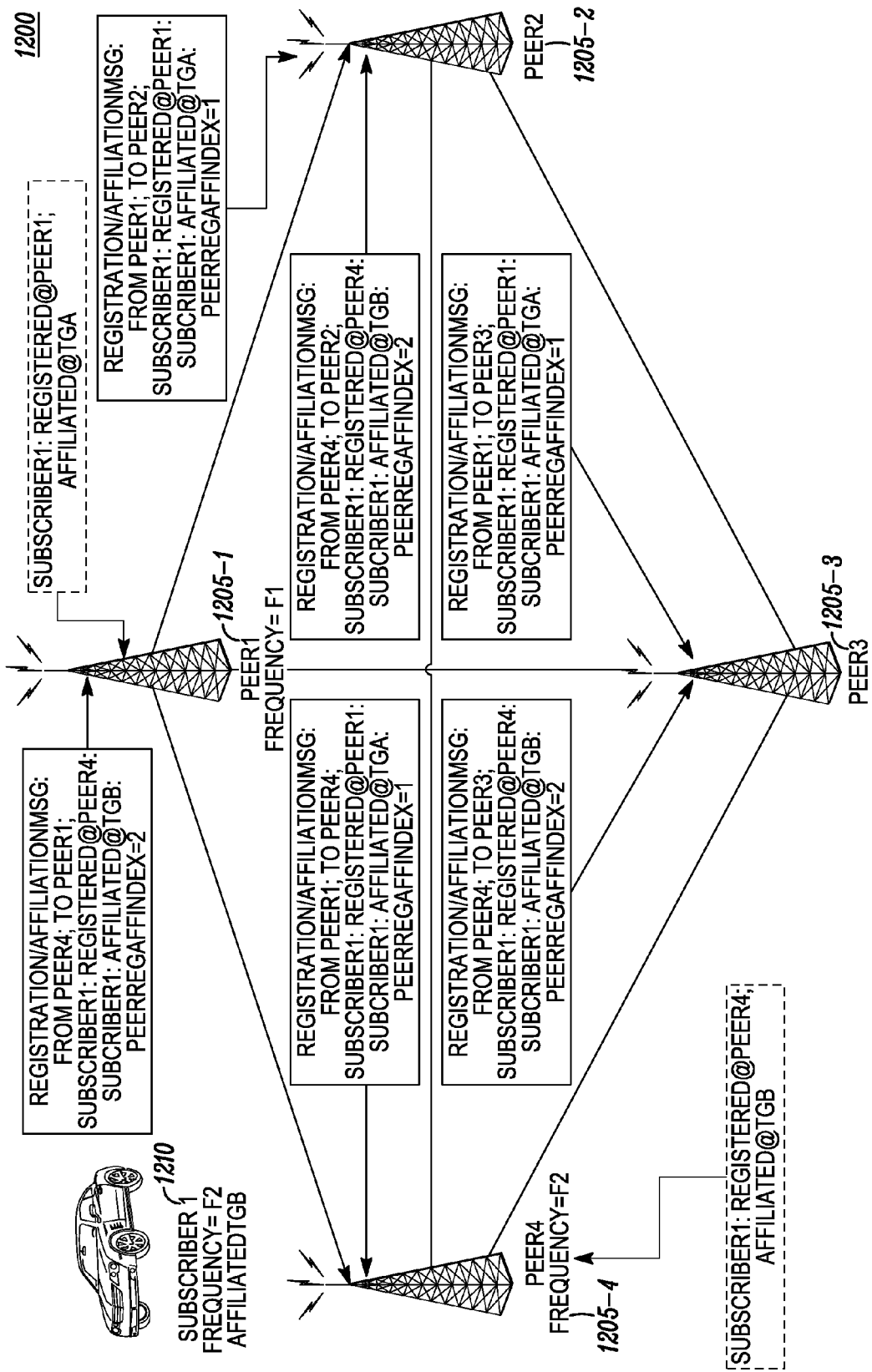

FIG. 17 illustrates the P2PWAN 100 in which Peer1 1205-1 and Peer4 1205-4 intend to update all other Peers 1205 of the P2PWAN 1200 that they each have received Subscriber 1210's registration/affiliation. As illustrated in FIG. 17, Peer1 1205-1 and Peer4 1205-4 each update all other Peers 1205-n with the registration/affiliation update they each received from Subscriber 1210. Peer1 1205-1 informs Peer2 1205-2, Peer3 1205-3, and Peer4 1205-4 that Subscriber 1210 is affiliated on TgA at Peer1 1205-1. Similarly, Peer4 1205-4 informs Peer1 1205-1, Peer2 1205-2, and Peer3 1205-3 that Subscriber 1210 is affiliated on TgB at Peer4 1205-4. In accordance with some embodiments, each update contains the relevant peerRegAffIndex. For example, the update from Peer1 1205-1 to Peer2 1205-2, Peer3 1205-3 and Peer4 1205-4 contains peerRegAffIndex=1; and the update from Peer4 1205-4 to Peer1 1205-1, Peer2 1205-2, and Peer3 1205-3 contains peerRegAffIndex=2. Each Peer receives the update.

Figure 18:
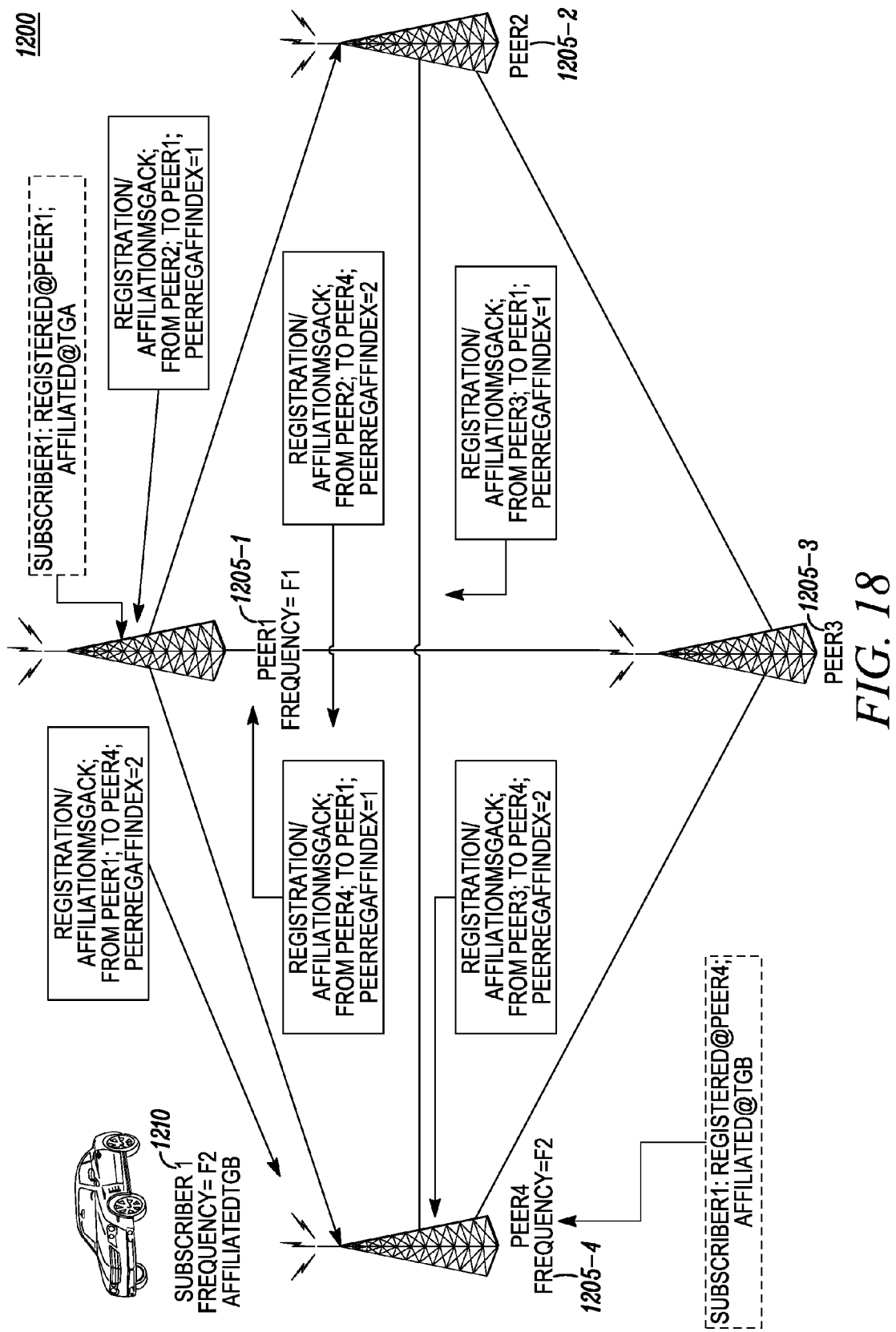

FIG. 18 illustrates the operation of the Peers upon receiving the update. Upon receiving the update, an acknowledgement is sent back. The acknowledgement contains the peerRegAffindex which matches the update. For example, as illustrated Peer2 1205-2 sends back an acknowledgment to Peer1 1205-1 with peerRegAffIndex=1; and Peer2 1205-2 sends back an acknowledgment to Peer4 1205-4 with peerRegAffIndex=2. Peer3 1205-3 sends back an acknowledgment to Peer1 1205-1 with peerRegAffIndex=1; and Peer3 1205-3 sends back an acknowledgment to Peer4 1205-4 with peerRegAffIndex=2. Peer1 1205-1 sends back an acknowledgment to Peer4 1205-4 with peerRegAffIndex=2. Peer4 1205-4 sends back an acknowledgment to Peer1 1205-1 with peerRegAffIndex=1.

As illustrated in FIGS. 17 and 18, Subscriber 1210 has settled on Peer4's frequency on TgB. However due to race conditions, (which can be exacerbated by packet drop), the notifications to the other Peers can arrive misaligned. Without some common reference, the Peers may only assume that the last update received from a Peer is the most valid. In this case there is a common reference: the subscriberRegAffIndex number sourced by Subscriber 1210. All Peers can now make the same, correct decision as to which Peer the subscriber is registered, to which talkgroup the subscriber is affiliated and on what frequency the subscriber is parked.

Because the update with the peerRegAffIndex=2 from Peer4 1205-4 is larger than the peerRegAffIndex value in the update message from Peer1 12-5-1 (i.e. peerRegAffIndex=1), all Peers make the common decision that Subscriber 1210 is parked on frequency=f2 on talkgroup=TgB.

Figure 19:
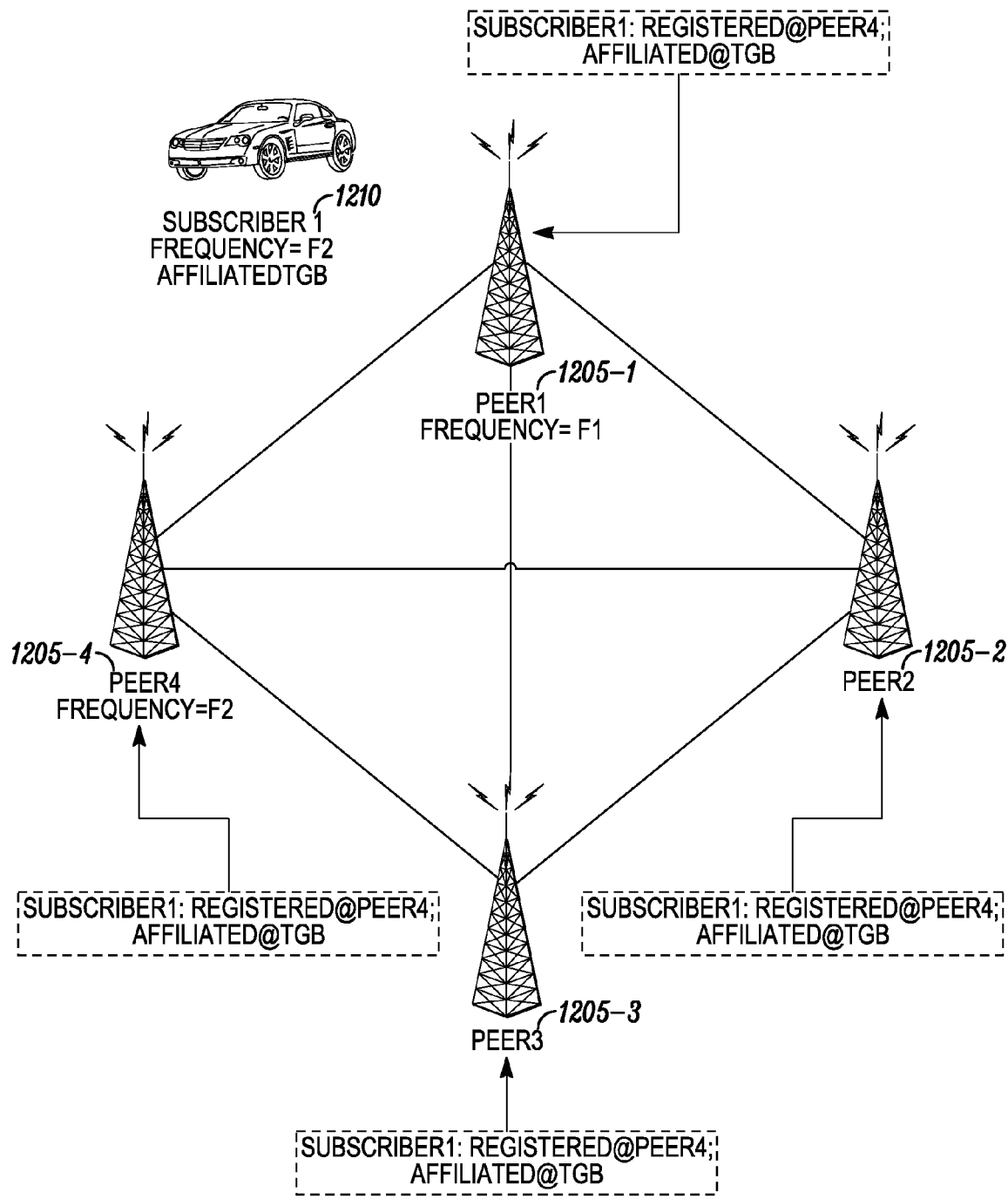

FIG. 19 and Table 2 below further illustrate the topological state as to where Subscriber 1210 is and on what talkgroup:

TABLE 2

Registration/Affiliation State in each Peer for Subscriber using peerRegAffIndex Values

| State Location | peerRegistered | TgAffiliation |
|---|---|---|
| Peer1 | Peer4 | TgB |
| Peer2 | Peer4 | TgB |
| Peer3 | Peer4 | TgB |
| Peer4 | Peer4 | TgB |

One can see this solution solves the problem of identifying which is the last registration/affiliation received from the subscriber. All the Peers will correctly route media to Peer4 1205-4 if the media is pertinent to Subscriber 1210.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for subscriber registration and affiliation in a peer to peer wide area network, the peer to peer wide area network comprising at least one subscriber device and a plurality of peer devices for providing wireless communications services to the at least one subscriber device, the method comprising:

a particular subscriber device communicating different registration and affiliation messages to different peer devices, each registration and affiliation message including at least (i) a subscriber device identifier uniquely identifying the particular subscriber device and (ii) a Subscriber Registration Affiliation Index, wherein the Subscriber Registration Affiliation Index is a number identifying a timing of the registration and affiliation message in which it is contained, relative to other registration and affiliation messages communicated by the particular subscriber device, the particular subscriber device varying a value of the Subscriber Registration Affiliation Index and transmitting another registration and affiliation message including the varied value of the Subscriber Registration Affiliation Index each time the particular subscriber device experiences a personality change, wherein the personality change comprises a change in at least one of a talkgroup affiliation, a frequency of operation, and an affiliation with one out of the plurality of peer devices;

at a particular peer device out of the plurality of peer devices for providing wireless communications services:

in response to receiving a particular registration and affiliation message from the particular subscriber device, routing a corresponding registration and affiliation update message to the other peer devices in the plurality, the registration and affiliation update message including (i) a subscriber device identifier uniquely identifying the particular subscriber device and (ii) a Peer Registration Affiliation Index equal to the received Subscriber Registration Affiliation Index from the particular registration and affiliation message;

comparing the Peer Registration Affiliation Index with one or more other Peer Registration Affiliation Indices associated with the same particular subscriber device received from the other peer devices; and selecting a Peer Registration Affiliation for the particular subscriber device corresponding to a Peer Registration Affiliation Index corresponding to a most recent registration and affiliation message communicated by the particular subscriber device such that the particular peer device maintains most recent subscriber device registration and affiliation information as provided in the most recent registration and affiliation message transmitted by the particular subscriber device to any one of the plurality of peer devices.

2. The method as claimed in claim 1, wherein the registration and affiliation message further includes a talkgroup affiliation.

3. The method as claimed in claim 1, further comprising:
in response to receiving the particular registration and affiliation message, communicating an acknowledgement message from the particular peer device to the particular subscriber device including the Peer Registration Affiliation Index;
comparing, at the particular subscriber device, the Peer Registration Affiliation Index received in the acknowledgement message with a current Subscriber Registration Affiliation Index of the particular subscriber device; and
when the Peer Registration Affiliation Index received in the acknowledgement message does not match the current Subscriber Registration Affiliation Index of the particular subscriber device, the particular subscriber device sending the current Subscriber Registration Affiliation to the particular peer device.

4. The method as claimed in claim 3, wherein the acknowledgement message further includes a peer device identifier and a subscriber device identifier.

5. The method as claimed in claim 1, further comprising:
detecting a first personality change at the subscriber device;
incrementing the Subscriber Registration Affiliation Index of the subscriber device; and
sending a second registration and affiliation message including the incremented Subscriber Registration Affiliation Index to the particular peer device.

6. The method as claimed in claim 1, further comprising:
at the particular subscriber device, detecting an expiration of a timer requiring a renewal of a personality state of the subscriber device within the peer to peer wide area network;
incrementing the Subscriber Registration Affiliation Index of the particular subscriber device; and
the particular subscriber device sending a second registration and affiliation message including the incremented Subscriber Registration Affiliation Index to the particular peer device.

7. The method as claimed in claim 1, further comprising:
detecting, at the particular subscriber device, an expiration of an acknowledgment timer without receipt of an acknowledgment message from the particular peer device; and
retransmitting the particular registration and affiliation message to the particular peer device.

8. A method for subscriber registration and affiliation in a peer to peer wide area network, the peer to peer wide area network comprising at least one subscriber device and a plurality of peer devices for providing wireless communications services to the at least one subscriber device, the method comprising:

affiliating a particular subscriber device with a first peer device, out of the plurality of peer devices for providing wireless communications services, on a first frequency and within a first talkgroup by communicating a first registration and affiliation message from the particular subscriber device to the first peer device, the first registration and affiliation message including (i) a subscriber device identifier uniquely identifying the particular subscriber device and (ii) a registration and affiliation index of the particular subscriber device, wherein the registration and affiliation index is a number identifying a timing of the registration and affiliation message in which it is contained, relative to other registration and affiliation messages communicated by the particular subscriber device, the particular subscriber device varying a value of the registration and affiliation index and transmitting another registration and affiliation message including the varied value of the registration and affiliation index each time the particular subscriber device experiences a personality change, wherein the personality change comprises a change in at least one of a talkgroup affiliation, a frequency of operation, and an affiliation with one out of the plurality of peer devices;

the particular subscriber device selecting a second peer device, out of the plurality of peer devices for providing wireless communications services, on a second frequency and within a second talkgroup for communication;

the particular subscriber device incrementing the registration and affiliation index;

affiliating the particular subscriber device to the second peer device on the second frequency and within the second talkgroup by communicating, from the particular subscriber device to the second peer device, a second registration and affiliation message including (i) the subscriber device identifier uniquely identifying the particular subscriber device and (ii) the incremented registration and affiliation index, wherein the incremented registration and affiliation index, wherein the incremented registration and affiliation index indicates a personality change at the subscriber device that is more recent than that reflected by the first registration and affiliation message;

the second peer device updating the other peer devices in the plurality of the registration and affiliation of the particular subscriber device by transmitting a corresponding registration and affiliation update message, including the incremented registration and affiliation index, to the other peer devices in the plurality; and identifying, at each of the other peer devices in the plurality, the particular subscriber device as registered and affiliated with the second peer device based on the value of the incremented registration and affiliation index.

9. The method of claim 8, wherein the second peer device and the second frequency is the same as the corresponding one of the first peer device and the first frequency, and the second talkgroup is different than the first talkgroup.

10. The method of claim 8, wherein the second peer device and the second talkgroup is the same as the corresponding one of the first peer device and the first talkgroup, and the second frequency is different than the first frequency.

11. The method of claim 8, wherein the second talk group and the second frequency is the same as the corresponding one of the first talk group and the first frequency, and the second peer device is different than the first peer device.

12. The method of claim 1, wherein the particular subscriber device transmits the particular registration and affiliation message to the particular peer device in response to detecting a first personality change, wherein the first personality change is a change in affiliation with one out of the plurality of peer devices.

13. The method of claim 1, wherein the particular subscriber device transmits the particular registration and affiliation message to the particular peer device in response to detecting a first personality change, wherein the first personality change is a change in frequency of operation.

14. The method of claim 1, wherein the particular subscriber device transmits the particular registration and affiliation message to the particular peer device in response to detecting a first personality change, wherein the first personality change is a change in talkgroup affiliation.

15. The method of claim 1, further comprising the particular peer device:
receiving media destined for one or more destination subscriber devices;
determining a most recent peer device affiliation for each destination subscriber device as a function of the selected Peer Registration Affiliation for each destination subscriber device; and
forwarding the media to only those peer devices out of the plurality of peer devices necessary to deliver the media to the one or more destination subscriber devices.

16. The method of claim 8, further comprising the first peer device:
receiving media destined for the particular subscriber device;
determining a most recent peer device affiliation for the particular subscriber device as a function of the registration and affiliation update message including the incremented registration and affiliation index from the second peer device; and
forwarding the media to only the second peer devices out of the plurality of peer devices.

17. The method of claim 1, further comprising the particular peer device receiving, after the particular registration and affiliation message, a second registration and affiliation update message from another one of the plurality of peer devices including a subscriber device identifier associated with the particular subscriber device and a Peer Registration Affiliation Index indicating that it reflects information that is less recent than information obtained from the particular registration and affiliation message, and responsively, continuing to use the registration and affiliation information from the particular registration and affiliation message.

18. The method of claim 8, further comprising the second peer device receiving, after the second registration and affiliation message, a second registration and affiliation update message from another one of the plurality of peer devices including a subscriber device identifier associated with the particular subscriber device and a Peer Registration Affiliation Index indicating that it reflects information that is less recent than information obtained from the second registration and affiliation message, and responsively, continuing to use the registration and affiliation information from the second registration and affiliation message.

* * * * *